United States Patent
Michaels et al.

(10) Patent No.: US 10,021,135 B1
(45) Date of Patent: Jul. 10, 2018

(54) INDUCING DATA LOSS IN ZIGBEE NETWORKS VIA JOIN/ASSOCIATION HANDSHAKE SPOOFING

(71) Applicants: Spencer Michaels, Miami, FL (US); Kemal Akkaya, Miami, FL (US); A. Selcuk Uluagac, Miami, FL (US)

(72) Inventors: Spencer Michaels, Miami, FL (US); Kemal Akkaya, Miami, FL (US); A. Selcuk Uluagac, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/862,073

(22) Filed: Jan. 4, 2018

Related U.S. Application Data

(60) Provisional application No. 62/573,433, filed on Oct. 17, 2017.

(51) Int. Cl.
*G06F 21/44* (2013.01)
*H04L 29/06* (2006.01)
*H04W 4/80* (2018.01)
*H04W 12/12* (2009.01)
*H04W 76/10* (2018.01)

(52) U.S. Cl.
CPC ...... *H04L 63/1483* (2013.01); *H04L 63/1425* (2013.01); *H04L 63/18* (2013.01); *H04W 4/80* (2018.02); *H04W 12/12* (2013.01); *H04W 76/10* (2018.02)

(58) Field of Classification Search
CPC .... H04L 63/14; H04L 63/1466; H04L 9/3271
USPC ............... 713/168, 151, 169; 726/22
See application file for complete search history.

(56) References Cited

U.S. PATENT DOCUMENTS 9,756,046 B2 * 9/2017 Chang ................. H04L 63/0876
2012/0124373 A1 * 5/2012 Dangoor ............... H04L 63/062
713/168

OTHER PUBLICATIONS

Sokullu et al., "On the IEEE 802.15.4 MAC layer attacks: GTS attack," The Second International Conference on Sensor Technologies and Applications, Aug. 2008, pp. 673-678.
Radmand et al., "Zigbee/zigbee pro security assessment based on compromised cryptographic keys," 2010 International Conference on P2P, Parallel, Grid, Cloud and Internet Computing, Nov. 2010, pp. 465-470.
Cao et al., "Ghost-in-zigbee: energy depletion attack on zigbee-based wireless networks," IEEE Internet of Things Journal, Oct. 2016, pp. 816-829, vol. 3, No. 5.

(Continued)

*Primary Examiner* — Izunna Okeke
(74) *Attorney, Agent, or Firm* — Saliwanchik, Lloyd & Eisenschenk

(57) ABSTRACT

Methods, systems, and devices for instituting a new type of attack on Zigbee networks are provided. Targeting the data-collection aspect of Zigbee's use cases, a denial-of-service attack can be implemented, and can induce loss of the data transmitted from an end device to the coordinator of the network. Such an attack can exploit the fact that the handshake for a newly joining node to the Zigbee coordinator is not encrypted. Methods, systems, and devices to mitigate such an attack are also provided. To mitigate such a type of attack, a low-overhead countermeasure can be implemented, based on a challenge-response.

7 Claims, 5 Drawing Sheets

(56) References Cited

OTHER PUBLICATIONS

Proano et al., "Selective jamming attacks in wireless networks," 2010 IEEE International Conference on Communications, May 2010, pp. 1-6.

Lee et al., "An approach to mitigating sybil attack in wireless networks using zigbee," 10th International Conference on Advanced Communication Technology, Feb. 2008, pp. 1005-1009.

Newsome et al., "The sybil attack in sensor networks: analysis & defenses," Proceedings of the Third International Symposium on Information Processing in Sensor Networks, Apr. 2004, pp. 1-10.

Stelte et al., "Thwarting attacks on zigbee—removal of the killerbee stinger," 2013 9th International Conference on Network and Service Management, Oct. 2013, pp. 219-226.

\* cited by examiner

| Time | Source | Destination | Info |
|---|---|---|---|
| 2203.999997 | | Broadcast | Beacon Request |
| 2203.999998 | 0x0000 | | Beacon, Src: 0x0000, |
| 2206.000010 | 0x0000 | Broadcast | Link Status |
| 2215.000025 | 0x0000 | | Beacon, Src: 0x0000, |
| 2215.000026 | 0x0000 | | Beacon, Src: 0x0000, |
| 2215.000026 | 0x0000 | Broadcast | Link Status |
| 2216.999951 | | Broadcast | Beacon Request |
| 2216.999943 | 0x0000 | | Beacon, Src: 0x0000, |
| 2216.999953 | 0x0000 | | Beacon, Src: 0x0000, |
| 2216.999954 | 0x0000 | Broadcast | Link Status |
| 2216.999966 | ab:bc:7d | 0x0000 | Association Request |
| 2216.999966 | ab:bc:7d | 0x0000 | Association Request |
| 2216.999966 | ab:bc:7d | 0x0000 | Association Request |
| 2216.999967 | ab:bc:7d | 0x0000 | Association Request |
| 2216.999967 | | | Ack |
| 2216.999968 | ab:bc:79 | ab:bc:7d | Association Response, |
| 2216.999985 | ab:bc:7d | 0x0000 | Data Request |
| 2216.999986 | ab:bc:7d | 0x0000 | Data Request |
| 2216.999986 | ab:bc:7d | 0x0000 | Data Request |
| 2216.999986 | ab:bc:7d | 0x0000 | Data Request |
| 2216.999987 | | | Ack |

FIG. 2

INDUCING DATA LOSS IN ZIGBEE NETWORKS VIA JOIN/ASSOCIATION HANDSHAKE SPOOFING

CROSS-REFERENCE TO RELATED APPLICATION

This application claims the benefit of U.S. Provisional Application Ser. No. 62/573,433, filed Oct. 17, 2017, the disclosure of which is hereby incorporated by reference in its entirety, including all figures, tables and drawings.

STATEMENT OF GOVERNMENT SUPPORT

This invention was made with government support under Grant No. CNS1461119 awarded by National Science Foundation. The government has certain rights in the invention.

BACKGROUND

The "Internet of Things" (IoT) is a concept referring to networks composed of "smart" versions of a variety of everyday physical objects (e.g., thermostats, sensors, home security systems, cars, and buildings) that have the ability to communicate with the broader Internet. Most IoT devices perform some kind of sensing to collect data about their environment, and many can react to changes with some form of actuator. Hence, the resulting security and privacy implications make IoT devices and networks an alluring target for cyberattacks. On this front, one of their most notable applications is the monitoring and control of potentially critical infrastructure (e.g., smart power grids or buildings). To make such use cases feasible, it is necessary to minimize the need for manual interaction during installation and configuration, ensure network security, make disparate devices compatible, and keep energy and maintenance costs low.

Zigbee, a popular IEEE 802.15.4-based specification for low-power mesh networks, aims to be a solution to the aforementioned problems. It has largely become an industry standard for IoT devices, with over 300 organizations to date having ratified the protocol as members of the Zigbee Alliance. Zigbee composes the network and application layers atop the 802.15.4 protocol's MAC layer and supports ad-hoc mesh networks with a transfer speed of 250 kbit/s, with 128-bit AES encryption, and numerous power-saving features such as sleep with scheduled wakeups. Each Zigbee network includes a single coordinator, which is the root node that manages the network, zero or more routers, which extend the mesh by performing internal routing, and zero or more end devices, which sense and interact with the environment and their neighbors. Although the protocol features both network-wide and pairwise encryption and authentication, the need for automatic network setup and low power consumption ultimately places significant limitations on its security measures, and Zigbee is already known to have a variety of vulnerabilities that have been identified and fixed in the past.

BRIEF SUMMARY

Embodiments of the subject invention provide methods, systems, and devices for instituting a new type of attack on Zigbee networks, and such an attack can demonstrate the vulnerability thereof. Targeting the data-collection aspect of Zigbee's use cases, a denial-of-service attack can be implemented, and can induce loss of the data transmitted from an end device to the coordinator of the network. Such an attack can exploit the fact that the handshake for a newly joining node to the Zigbee coordinator is not encrypted. By creating a rogue coordinator, it can be demonstrated that a new node can be convinced to join the rogue coordinator, which can the collect the data from the new node (e.g., the end device) until the rogue coordinator is noticed (e.g., by the actual coordinator and/or by the end device or another end device on the network).

Embodiments of the subject invention also provide methods, systems, and devices to mitigate the denial-of-service attack discussed herein. To mitigate such a type of attack, a low-overhead countermeasure can be implemented, based on a challenge-response.

BRIEF DESCRIPTION OF DRAWINGS

FIG. 2 shows a Wireshark capture of a successful attack on a Zigbee network, according to an embodiment of the subject invention. The repeated association and data requests are the result timeouts caused by the attacker's relatively long response time.

DETAILED DESCRIPTION

Figure 1:
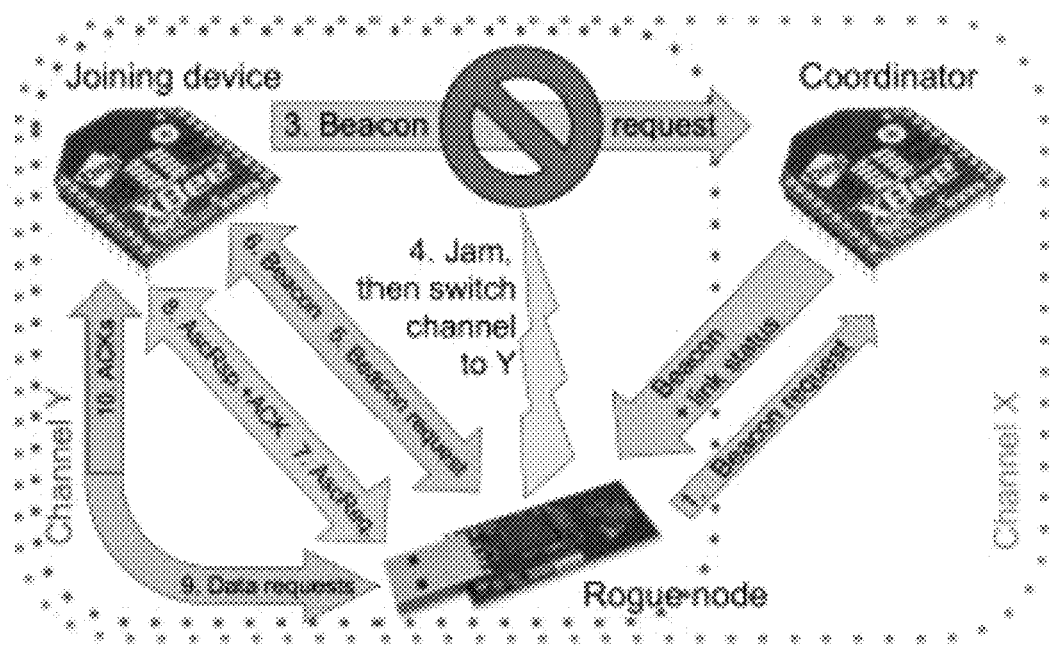
FIG. 1 shows a graphical representation of an attack on a Zigbee network, according to an embodiment of the subject invention.

Embodiments of the subject invention provide methods, systems, and devices for instituting a new type of attack on Zigbee networks (IEEE 802.15.4-based specification for low-power mesh networks), and such an attack can demonstrate the vulnerability thereof. Targeting the data-collection aspect of Zigbee's use cases, a denial-of-service attack can be implemented, and can induce loss of the data transmitted from an end device to the coordinator of the network. Such an attack can exploit the fact that the handshake for a newly joining node to the Zigbee coordinator is not encrypted. By creating a rogue coordinator, it can be demonstrated that a new node can be convinced to join the rogue coordinator, which can the collect the data from the new node (e.g., the end device) until the rogue coordinator is noticed (e.g., by the actual coordinator and/or by the end device or another end device on the network).

Embodiments of the subject invention also provide methods, systems, and devices to mitigate the denial-of-service attack discussed herein. To mitigate such a type of attack, a low-overhead countermeasure can be implemented, based on challenge-response. Both the attack and its countermeasure have been successfully demonstrated, and have been shown to have acceptable efficiency.

The methods and processes described herein can be performed using devices with processors, (non-transitory) machine-readable media (e.g., (non-transitory) computer-readable media), and/or other components that can be used to initiate the attack and/or implement the countermeasure as described herein.

The stringent performance and power limitations of most Zigbee devices makes denial-of-service (DoS) attacks a much more serious threat than might be the case for general-purpose computers. DoS attacks may be carried out by occupying a device's computational or network resources, forcing it to consume its power reserves, using collision avoidance to force it to wait unusually long times before sending data, or directly corrupting signals over the air. Such attacks can broadly be divided into several major categories: energy depletion, jamming, and various forms of protocol-level manipulation.

Energy-depletion attacks include forcing a node to consistently use more energy than usual in order to take it offline via power loss. This includes either repeatedly inducing the node to perform an energy-intensive calculation that would otherwise be infrequent, or keeping it from going into a power-saving sleep mode (i.e., "denial of sleep"). These kinds of attacks are something of a unique problem for Zigbee, given that most end devices are battery-powered.

Jamming attacks rely more on the laws of physics than the specific nature of the protocol being attacked, simply inducing interference in a network's communications to render them unintelligible. Jamming can be continuous, periodic, or selective (e.g., corrupting only specific packets). Being the "brute force" of cyberattacks, jamming is among the hardest to counteract, but is also relatively easy to detect.

DoS attacks that work by manipulating network behavior that is defined by, or specific to, the 802.15.4 or Zigbee protocols are of great interest. This includes exploitation of guaranteed time slots, network ID conflicts, replay protection, acknowledgment (ACK) behavior, and node identities. Embodiments of the subject invention include exploiting selective jamming to exploit DoS for creating a rogue coordinator.

Proposed solutions to DoS attacks include challenge response systems to verify a node's identity, various forms of analysis for active detection/mitigation of spoofing and exhaustion attacks, encrypted headers to prevent ACK and replay attacks, and multiple layers of authentication to reduce load on the controlling elements of the network during a DoS attack. Embodiments of the subject invention include a challenge-response based authentication to address or mitigate a DoS attack, including the type discussed herein (exploiting selective jamming to exploit DoS for creating a rogue coordinator).

Figure 4:
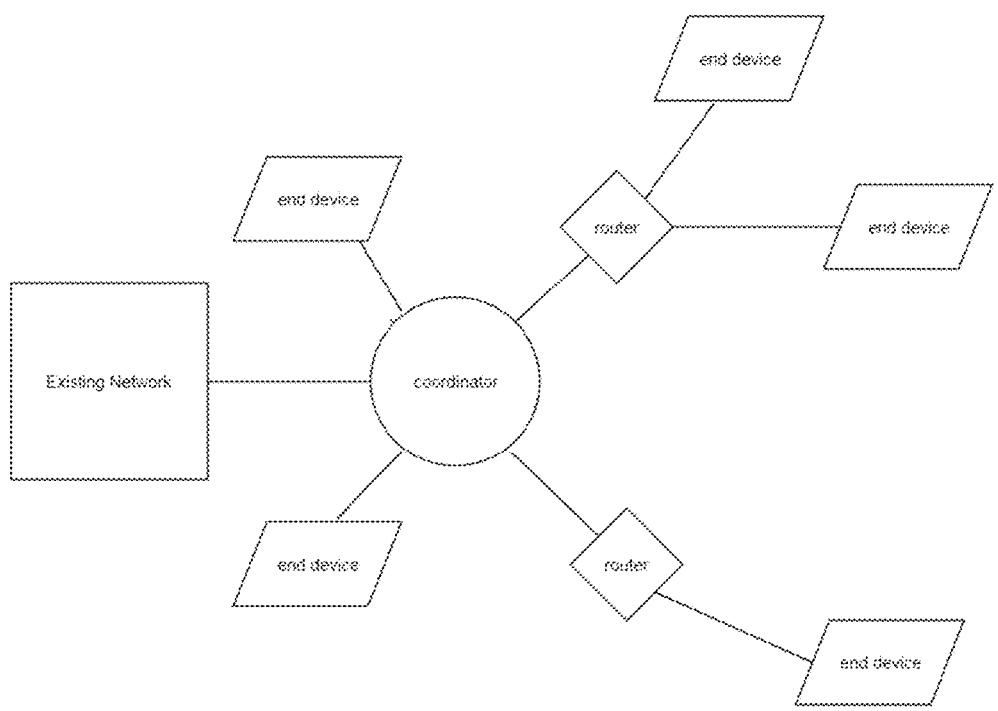
FIG. 4 is a diagram illustrating a Zigbee network according to an embodiment of the subject invention.

As seen in FIG. 4, Zigbee networks can include coordinators, routers, and end devices. In certain applications coordinators and routers can be included in a single device. An external network, including a processor, can be configured to be in electrical communication with the coordinator. Zigbee networks rely upon mesh networks to wirelessly, for example across radio frequencies, communicate through nodes. The coordinator can establish a mesh network, provide data storage; routers can act as intermediaries and transmit data between devices; and end devices can receive and transmit data either directly to a coordinator or through a router.

Zigbee mesh networks can operate through beacon and non-beacon networks and use up to 16 channels across specified bands, currently 2.4-2.4835 GHz, 902-928 MHz, and 868-868.6 MHz. In beacon networks, a coordinator can coordinate communication by periodically causing routers to transmit beacons. The beacons can provide the nodes with a schedule upon which to transmit data. Nodes can enter sleep mode in between beacon intervals. In non-beacon networks, a carrier-sense multiple access with collision avoidance networking method is implemented in order to transmit entire data packets between nodes. Nodes can avoid collisions by only transmitting data packets across idle channels or when an external stimulus signal is detected (for example smoke to a smoke alarm). Given a Zigbee network including a coordinator, router, and at least one end device, and assuming that the network's encryption cannot be overcome, in order to attack such a network, the goal can be to induce loss of the data transmitted from an end device to the coordinator. Ideally, the attack should not be readily apparent to the target devices, minimizing the amount of abnormal activity they perceive. Another goal in such a situation, from the other perspective, is to have a countermeasure to such an attack. The countermeasure can have low overhead under normal conditions, and should be able to be implemented without major modification to the standard. Embodiments of the invention can accomplish both of these goals.

In some embodiments, an attack can exploit Zigbee's unauthenticated join/association process. In other embodiments, such an attack can be guarded against. The attack can include an attacker impersonating a network's coordinator and inducing new end devices to connect to the attacker's device on an alternate channel, acting as a "black hole" for the data that the end devices subsequently send. The security goal to counter this can be that the end device caches recently-sent packets and uses a challenge-response system to ensure that they were received by the real coordinator, restarting the network search process and resending the cache contents if the response fails.

Figure 5:
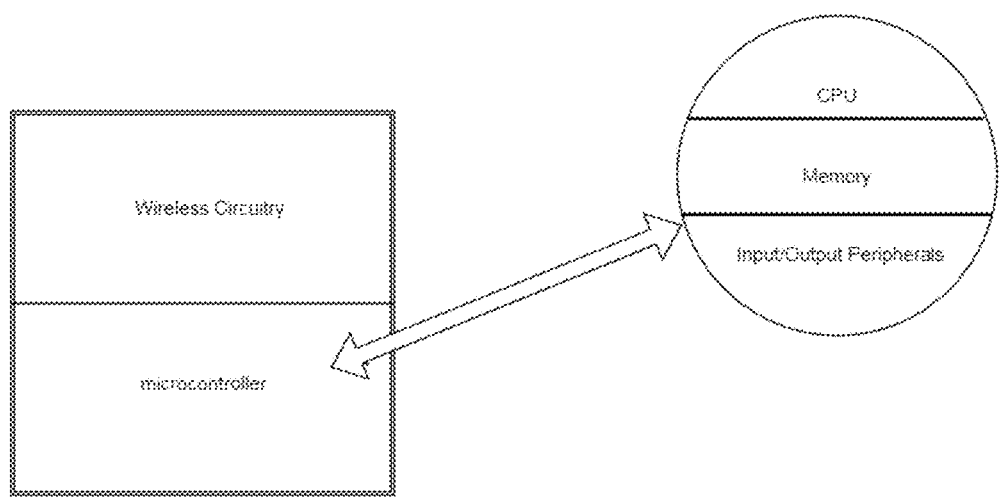
FIG. 5 shows a diagram of a rogue agent configured to attack a Zigbee network according to an embodiment of the subject invention.

A rogue device, as seen in FIG. 5, can comprise a microcontroller in electronic communication with wireless circuitry. The wireless circuitry, including an RF module, can be configured to transmit and receive signals from another device. The microcontroller can comprise a central processing unit, memory, and input-output peripherals. The microcontroller can provide instruction to the rogue device, store intercepted data and direct corrupted data to be transmitted to another device. The input output peripherals can include sensors, a mouse, a keyboard, scanners, microphones, and touchscreens. It should be appreciated by one of ordinary skill in the art that an end device can comprise the same or similar components as the rogue device.

In an embodiment, an attack process can be divided into three main steps. First, the attacker can passively listen to the target network to acquire information needed to spoof its coordinator. Second, the attacker can wait for a new device to arrive to search the network, and can block the attempt. Third, the attacker can spoof the coordinator on another channel, maintaining the resulting connection with the end device for as long as possible. This process is illustrated in FIG. 1.

In the following description, A denotes the attacker, C the coordinator, and E the new end device joining the network.

I. First, the attacker can acquire network information.
  1) A can determine C's channel, hereafter denoted c. This can be accomplished by listening for traffic a few seconds on each of Zigbee's 16 available channels. If there are several active networks, they can be distinguished by observing unencrypted packets like beacons as well as the unencrypted headers of encrypted packets like link status announcements.

2) A can move to channel c and waits for a link status packet. These packets can broadcast by the coordinator every 16 seconds (or less in certain cases), and may be encrypted. However, the relevant fields (for example, the sequence number and C's full MAC address) are present in the unencrypted header of the link status packet.

3) A can broadcast a beacon request and listen for the beacon that C sends in response, saving it for future use. Constructing the beacon request does not require any information specific to the target network.

II. The attacker can intercept a new device.

1) A can listen to network traffic on channel c until it sees a beacon request from the newly-joining device E. It can use a very short burst of jamming to corrupt that packet only, which results in C ignoring the request, and thus not revealing itself via a beacon. Although continuous jamming is easily detectable, the few microseconds of jamming needed to corrupt one packet may well look identical to the occasional corruption that occurs naturally due to noise.

2) A can switch to channel c+1 in order to avoid interfering with (or being detected by) devices in the target network on channel c.

III. The attacker can spoof the coordinator.

1) A can wait for a beacon request from E. When it sees one, A can replay the beacon previously acquired (as discussed above), with its sequence number incremented by 1 to ensure that E does not ignore the packet.

2) A can wait for and acknowledge (ACK) an association request from E. Based on the network information previously acquired (as discussed above), A can send an association response to E.

IV. The attacker can maintain the connection.

1) E can regularly send data requests, as well as encrypted data packets, to A, which it believes to be C.

2) A can ACK each new packet, keeping the connection alive. Once E receives an acknowledgement of data receipt from the device it believes to be C and it is likely to discard its own copy of that data, as Zigbee devices generally have little to no storage capacity.

The discovered vulnerability stems from the lack of authentication during the join/association handshake, in combination with certain automatic behaviors of the end device. The latter has no ability to verify a coordinator's identity before it has fully joined the network. However, upon joining the network, the end devices automatically begin sending data to the coordinator, thus potentially resulting in its loss. As such, the solution must somehow involve verifying the coordinator's identity as a condition for sending data (or, at least, for the end device to discard its own copy of the data). There are several ways that this could be accomplished, including an encrypted/authenticated handshake or a challenge-response either once or periodically after associating.

Encrypted handshakes are the most direct solution; from a technical standpoint, this is possible. In generic 802.15.4, the Media Access Control (MAC) layer can use the Advanced Encryption Cypher-Client Configuration Manager (AES-CCM) block cipher mode to provide both encryption and authentication. However, in order to ensure low power consumption, the Zigbee standard explicitly states that the MAC layer must have security disabled. This precludes securing the handshake itself.

As such, the next-best option is to perform identity verification as soon as possible after association is complete (i.e., once encryption and authentication are available). Embodiments of the subject invention can include doing so via a challenge-response based on possession of the network key. Zigbee's current standard includes a "secure join" mode, wherein the network key is never transmitted, and assumed to be known by all devices in advance. Thus, in highly secure networks, it can be assumed that all devices on the network, and only those devices, have been pre-loaded with the key. Therefore, in some embodiments, the following mechanism can be used to prevent or inhibit data loss. At the network layer, two new message types can be implemented: "coordinator identity challenge" and "coordinator identity response," both with an N-byte encrypted data payload which serves as either the challenge or response. Once the end device successfully associates, and before it begins sending any other packets, the following process can occur:

1) The end device can send the coordinator an identity challenge, using a random N-byte number as the payload.

2) When the coordinator receives the challenge, it can decrypt the payload and performs a hard-coded, computationally trivial operation on it (e.g., bit inversion), using the result as the payload of the response.

3) The end device, upon receiving the response, can decrypt the payload and compare it to the result of the same operation on its original challenge payload.

4) If the challenge response is valid, communication can proceed as normal. However, if it fails or the coordinator does not respond within a short time, the end device can leave the network and restarts network discovery.

This alone would be sufficient to deal with a single iteration of the attack described herein. However, so long as authentication is not available until after the handshake completes, there still exists the possibility that the attacker could spoof the coordinator a second time to continue the attack. Fortunately, reliably jamming the initial beacon request every time a new device joins may not be possible without specialized hardware/firmware. As such, it may be reasonable to assume that each time the end device disconnects and retries, there is a good chance that it will discover the actual coordinator. Further, if both the coordinator and attacker are discovered, the former, being an actual Zigbee device, will generally be able to respond faster. In finding a network to join, Zigbee devices will choose the one with the most reliable connection if more than one is discovered that satisfies all required criteria. Thus, the end device will choose to associate with the actual coordinator over an otherwise-identical attacker.

It may also be possible to spoof the coordinator at later points in time, after association; one trivial example is to flood the coordinator itself in some way and fake its ACKs, which are MAC-level and thus unencrypted. As a further measure against data loss in this situation, it is noted that Zigbee end devices, although resource-limited, do likely have a small amount of free memory. This can be used to keep a cache of the last M messages sent, with the invariant that only the messages in the cache are not known to have been received by the real coordinator; all earlier ones have been verified with a previous challenge-response. When the cache is full or near-full, the challenge-response is issued again, and the process described above (steps 1-4) can commence. If the response is valid, the cache can be cleared. If not, the cache contents are kept, and once the end device connects to a coordinator whose response is valid, all cached messages are resent before sending new data.

Embodiments of the subject invention can expose the vulnerability of Zigbee devices' join/association handshake. An attacker can reliably spoof a network's coordinator to a new end device (particularly if give the proper hardware). This has the potential to result in loss of the data sent automatically from the end device to the fake coordinator during that time. The current Zigbee standard explicitly prohibits MAC-level encryption, thereby preventing the use of an encrypted/authenticated handshake to combat such an attack. Instead, embodiments of the subject invention provide a network-layer challenge-response countermeasure that can be used both after completing the association process, and/or periodically in combination with a small cache as a buffer against data loss.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method of attacking a Zigbee network, the method comprising:
intercepting a first signal propagated from a first Zigbee coordinator;
identifying a first channel used by the Zigbee coordinator to propagate the first signal; and
transmitting a beacon request signal to the Zigbee coordinator.

Embodiment 2

The method according to embodiment 1, further comprising:
intercepting a beacon signal transmitted from the Zigbee coordinator;
intercepting a first beacon request signal from an end device;
filtering the first beacon request signal from the end device; and
configuring a rogue device to propagate a signal on a second channel;

Embodiment 3

The method according to embodiment 2, further comprising:
intercepting a second beacon request from the end device; and
transmitting, on the second channel, the beacon signal to the end device.

Embodiment 4

The method according to any of embodiments 1-3, the intercepted first signal being a link state packet.

Embodiment 5

The method according to any of embodiments 1-4, the intercepted first signal further comprises a sequence number and a media access control (MAC) address for the Zigbee coordinator.

Embodiment 6

The method according to any of embodiments 2-5, the beacon request signal filtering comprising jamming, blocking, or interfering with the first beacon request signal.

Embodiment 7

The method according to any of embodiments 2-6, further comprising:
transmitting, on the second channel, an appropriate sequence number along with the beacon signal to the end device.

Embodiment 8

The method according to any of embodiments 3-7, further comprising:
receiving an association request from the end device; and
transmitting, on the second channel, an acknowledgement to the end device.

Embodiment 9

The method according to any of embodiments 3-8, further comprising:
receiving a data request or an encrypted data packet from the end device.

Embodiment 10

The method according to any of embodiments 3-9, further comprising:
transmitting, on the second channel, an acknowledgment in response to the data request or the encrypted data packet.

Embodiment 11

The method according to any of embodiments 3-10, further comprising:

distinguishing a first Zigbee coordinator from a second Zigbee coordinator by intercepting an unencrypted packet and an unencrypted header of an encrypted packet.

Embodiment 12

The method according to embodiment 11, the unencrypted packet being a beacon.

Embodiment 13

The method according to embodiment 11, the unencrypted header being a link state announcement.

Embodiment 14

A method of mitigating an attack on a Zigbee network (as described in claim 1), the method comprising:
providing a Zigbee coordinator with a filter;
receiving an identify challenge signal from an end device;
filtering the identity challenge signal; and
transmitting the filtered identify challenge signal to the end device.

Embodiment 15

The method according to embodiment 14, the identify challenge signal being an N-byte number.

Embodiment 16

The method according to any of embodiments 14-15, the filter being changing a state of each bit in the N-byte number to an opposite state.

Embodiment 17

The method according to any of embodiments 14-16, further comprising:
providing an end device with the filter;
transmitting an identity challenge signal to an unknown device;
receiving an identity response signal from the unknown device; and
filtering the identity challenge signal transmitted to the unknown device.

Embodiment 18

The method according to any of embodiments 14-17, further comprising:
comparing identity response signal and the filtered identify challenge signal;
determining the identity response signal is not the same as the filtered identify challenge signal; and
ceasing communication with the unknown device.

Embodiment 19

The method according to any of embodiments 14-18, the filter provided to the end device being changing a state of each bit in the N-byte number to an opposite state.

Embodiment 20

The method according to any of embodiments 14-19, the end device being configured to transmit a random N-byte number.

Embodiment 21

The method according to any of embodiments 14-20, the method further comprising:
detecting a time period between transmission of identity challenge signal to unknown device and receipt of identity response signal;
determining that the time period is outside of a predetermined range; and
ceasing communication with the unknown device.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

An experiment was performed to test both the attack and the countermeasure described herein. The experiment made use of three main types of devices, as well as various accessory components pertaining to them: the Digi International XBEE Series 2; the Atmel RZUSBstick; and a Great Scott Gadgets HackRF One. The Digi International XBEE Series 2 is a 802.15.4 radio module with proprietary firmware. Versions for the 868 MHz, 900 MHz, and 2.4 GHz frequency bands exist; the latter variant, which is the most common, was used for the experiment. For the network itself, two XBEE devices were used, one serving as a coordinator and the other as an end device. Both were controlled by a USB connection to a laptop using XCTU, a program for the configuration and control of XBEE-based networks. One device was flashed with the Zigbee Coordinator AT firmware, version 20A7, and the other with the Zigbee End Device AT firmware, version 28A7. For carrying out the attack and monitoring the network, three Atmel RZUSBsticks were used. The RZUSBstick is a 2.4 GHz 802.15.4 radio with open firmware and support for River Loop Security's Killerbee firmware, a custom framework for attacking Zigbee and 802.15.4 networks. The Atmel AVR Dragon was used to flash Killerbee onto the RZUSBstick over its JTAG interface. One RZUSBstick was used for packet capture with Killerbee's zbwireshark tool; two more were used together to perform the attack, with one sending and the other receiving. Two were necessary because a single RZUSBstick's hardware does not permit switching between receive and send modes rapidly enough to reliably respond in time to ACKs and other packets requiring responses. Killerbee's tools take the form of Python scripts that run on a separate computer and send commands to the firmware over USB. Linux Mint 17.3 in Virtualbox on a Macbook was used to run the Killerbee scripts, as Killerbee does not support OS X due to its nonstandard libusb implementation. The attack used selective jamming, which required specialized hardware/firmware; as such, an actual jammer was not used. Instead, the network was manipulated manually to simulate the effects of jamming.

Observations via Wireshark of normal Zigbee network behavior showed that the end device will only send a stream of data requests to the coordinator after the handshake had completed successfully. Less frequently, among these data requests, it will send encrypted data packets, containing, for instance, sensor measurements. In a few captures, a single data request was also observed after the association request but before the response. However, this is likely just a limitation of the granularity of time measurements, as there were also certain sets of packets whose send order was known exactly, but which were occasionally out of chronological order in Wireshark if one was sent almost immediately after the other. As such, the attack was considered to be successful if the end device began to send data requests to the attacker.

By this definition, performing the attack on the sample network resulted in several instances of success, though successful connections occurred only sporadically and stayed up for less than a second each time. These results still suggest that the attack is feasible because it appears that the failures were not due to the mechanics of the attack itself, but rather the hardware used to implement it. Although the XBEE's firmware is proprietary, it was also observed via Wireshark that the devices have an ACK timeout of around 200 µs, and a maximum of three re-tries. The opensource implementation of the RZUSBstick firmware can be checked directly to reveal that it requires 690 µs to switch from receive to send mode; thus, a single device cannot ACK within the 800 µs necessary to prevent the end device from timing out. Even when using two devices, one each for sending and receiving, the imperfect timing caused by Python, virtualized Linux, and Mac OS X all compound to make the response time unreliable. With that setup, however, the responses were occasionally rapid enough for a successful handshake, although just barely: in the Wireshark capture shown in FIG. 2, ACK of the association and data requests was only managed at the last possible moment, on the third retry. Therefore, from the results of the experiment, the attack is indeed feasible given suitable hardware and an implementation in firmware.

Based on the packet exchanges observed in a Zigbee network under normal conditions, it appears that there do exist certain encrypted messages that the end device will eventually expect from the coordinator and which, under the assumptions discussed herein, could not be forged by the attacker. It is suspected that without the ability to forge these packets, the end device will eventually terminate the connection. However, the encrypted messages appear to be very infrequent compared to the data packets, and it is expected that given proper ACKing ability, the connection could be maintained long enough to cause significant data loss.

Figure 3:
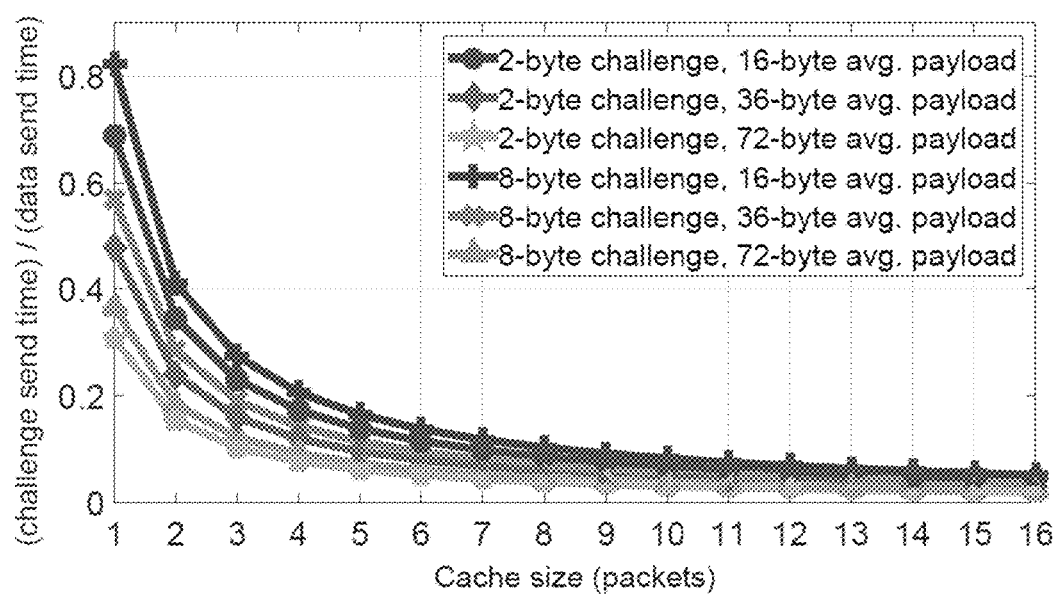
FIG. 3 shows a plot of (challenge send time)/(data send time) versus cache size of packets, demonstrating the proportion of time an end device spends sending the periodic challenge versus sending actual data. Each line takes the form of challenge size in bytes, average size of data payload. In the plot of FIG. 3, the (purple) top-most line with cross data points is for "8, 16", the (royal blue) second-from-the-top line with circle data points is for "2, 16", the (green) third-from-the-top line with double-diamond data points is for "8, 36", the (red) fourth-from-the-top line with diamond data points is for "2, 36", the (light blue) fifth-from-the-top line with triangle data points is for "8, 72", and the (yellow) bottom-most line with star data points is for "2, 72" (for each line, the first number in quotes is number of bytes in the challenge, and the second number in quotes and after the comma is for the number of bytes in the average payload (e.g., "8, 16" represents 8-byte challenge, 16-byte average payload)).

The largest obstacle to the cache portion of the solution is that Zigbee devices' memory space is extremely small. The XBEE Series 2, for instance, only has 2 KB RAM in total, and Zigbee payloads can be up to 72 bytes in length. If it is assumed that the cache only has to store the payload data (i.e., the header content can be recreated later), it is noted that the entire XBEE memory space is only enough to store 28 packets. This is further limited by the RAM usage of the Zigbee stack itself. Specific metrics on how much RAM the stack should be expected to use could not be specified, as this varies significantly depending on the device's settings. For the purposes of this experiment, it was assumed that the cache size cannot exceed 16 packets, with the caveat that the actual maximum may be even less. Based on this, a theoretical projection was produced, as seen in FIG. 3, of the efficiency loss induced upon the end device by our solution, as measured by:

$$\frac{\text{time spent sending challenge packets}}{\text{time spent sending data packets}}$$

The time to send a packet, assuming the channel is always clear, is calculated as $t(b) 128 \ \mu s + (25+b) \cdot 32 \ \mu s$, where b is the number of bytes to send. The clear-channel assessment takes a constant 128 µs, each byte takes 32 µs to send, and the header is 25 bytes long. The plot of these values in FIG. 3 presents separate trend lines for the challenge size (2 and 8 bytes) and the average size of data packets (16, 36, and 72 bytes), for cache sizes from 1 to 16. The model indicates that, for a 2-byte challenge and a size-8 cache, at most 10% of the overall transmission time will be used for sending challenges, supposing that the length of the data payloads averages at least 16 bytes. These estimates suggest that it is possible to use the countermeasure solution in practice, striking a balance between increased security and efficiency loss.

Based on the experimental observations and theoretical model, given the limited options for securing the handshake itself, and assuming that the attacker is unlikely to have access to specialized hardware, the challenge-response mechanism can be used to provide some additional resilience to the DoS attack discussed herein. This may come at the cost of a notable, though not overwhelming, decrease in data transmission efficiency.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] R. Sokullu, O. Dagdeviren, and I. Korkmaz, "On the ieee 802.15.4 mac layer attacks: Gts attack," in Sensor Technologies and Applications, 2008. SENSORCOMM '08. Second International Conference on, August 2008, pp. 673-678.

[2] P. Radmand, M. Domingo, J. Singh, J. Arnedo, A. Talevski, S. Petersen, and S. Carlsen, "Zigbee/zigbee pro security assessment based on compromised cryptographic keys," in P2P, Parallel, Grid, Cloud and Internet Computing (3PGCIC), 2010 International Conference on, November 2010, pp. 465-470.

[3] R. Hunt, "Emerging wireless personal area networks (wpans): x2014; an analysis of techniques, tools and threats," in 2012 18th IEEE International Conference on Networks (ICON), December 2012, pp. 274-279.

[4] T. Zillner and S. Strobl, "Zigbee exploited—the good, the bad and the ugly," in Black Hat USA, 2015.

[5] X. Cao, D. Shila, Y. Cheng, Z. Yang, Y. Zhou, and J. Chen, "Ghost-in-zigbee: Energy depletion attack on zigbee based wireless networks," IEEE Internet of Things Journal, vol. PP, no. 99, pp. 1-1, 2016.

[6] C. Balarengadurai and S. Saraswathi, "Detection of exhaustion attacks over ieee 802.15.4 mac layer using fuzzy logic system," in 2012 12$^{th}$ International Conference on Intelligent Systems Design and Applications (ISDA), November 2012, pp. 527-532.

[7] A. Proano and L. Lazos, "Selective jamming attacks in wireless networks," in Communications (ICC), 2010 IEEE International Conference on, May 2010, pp. 1-6.

[8] H. N. Dalal, N. V. Soni, and A. Razaque, "Header encryption of ieee 802.15.4," in 2016 IEEE Long Island Systems, Applications and Technology Conference (LISAT), April 2016, pp. 1-6.

[9] G. Lee, J. Lim, D. k. Kim, S. Yang, and M. Yoon, "An approach to mitigating sybil attack in wireless networks using zigbee," in Advanced Communication Technology, 2008. ICACT 2008. 10th International Conference on, vol. 2, February 2008, pp. 1005-1009.

[10] J. Newsome, E. Shi, D. Song, and A. Perrig, "The sybil attack in sensor networks: analysis defenses," in Information Processing in Sensor Networks, 2004. IPSN 2004. Third International Symposium on, April 2004, pp. 259-268.

[11] V. Thulasi and S. Anbu, "Cluster-based mechanisms in support vector machine to integrate and detect spoofing," in Information Communication and Embedded Systems (ICICES), 2014 International Conference on, February 2014, pp. 1-4.

[12] S. H. Lee and J. H. Kim, "Design of authentication protocol for lrwpan using pre-authentication mechanism," in 2009 6th IEEE Consumer Communications and Networking Conference, January 2009, pp. 1-5.

[13] B. Stelte and G. D. Rodosek, "Thwarting attacks on zigbee—removal of the killerbee stinger," pp. 219-226, October 2013.

What is claimed is:

1. A method of mitigating an attack on a Zigbee network, the method comprising:
providing a Zigbee coordinator with a filter;
receiving, by at least one processor, an identity challenge signal from an end device;
filtering, by the at least one processor, the identity challenge signal; and
transmitting, by the at least one processor, the filtered identity challenge signal to the end device,
the attack that is being mitigated comprising the following:
intercepting a first signal propagated from the first Zigbee coordinator;
identifying a first channel used by the Zigbee coordinator to propagate the first signal;
transmitting a beacon request signal to the Zigbee coordinator;
intercepting a transmitted beacon signal from the Zigbee coordinator;
intercepting a first beacon request signal from an end device;
filtering the first beacon request signal from the end device;
configuring a rogue device to propagate a signal on a second channel;
intercepting a second beacon request from the end device; and
transmitting, on the second channel, the beacon signal to the end device.

2. The method according to claim 1, the identity challenge signal being an N-byte number, and
the filter being changing a state of each bit in the N-byte number to an opposite state.

3. The method according to claim 1, further comprising:
providing an end device with the filter;
transmitting, by the at least one processor, an identity challenge signal to an unknown device;
receiving, by the at least one processor, an identity response signal from the unknown device; and
filtering, by the at least one processor, the identity challenge signal transmitted to the unknown device.

4. The method according to claim 3, further comprising:
comparing, by the at least one processor, identity response signal and the filtered identity challenge signal;
determining, by the at least one processor, the identity response signal is not the same as the filtered identity challenge signal; and
ceasing communication with the unknown device.

5. The method according to claim 3, the filter provided to the end device being changing a state of each bit in the N-byte number to an opposite state.

6. The method according to claim 3, the end device being configured to transmit a random N-byte number.

7. The method according to claim 1, further comprising:
detecting, by the at least one processor, a time period between transmission of identity challenge signal to unknown device and receipt of identity response signal;
determining, by the at least one processor, that the time period is outside of a predetermined range; and
ceasing communication with the unknown device.

* * * * *